United States Patent
Jiao

(10) Patent No.: US 11,275,424 B2
(45) Date of Patent: Mar. 15, 2022

(54) METHOD FOR OPERATING A DEVICE HAVING A SWITCHABLE POWER SAVING MODE FOR REDUCING ITS POWER CONSUMPTION

(71) Applicant: ORANGE, Issy-les-Moulineaux (FR)

(72) Inventor: Shi Jiao, Beijing (CN)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/472,563

(22) PCT Filed: Dec. 14, 2017

(86) PCT No.: PCT/IB2017/001662
§ 371 (c)(1),
(2) Date: Jun. 21, 2019

(87) PCT Pub. No.: WO2018/115958
PCT Pub. Date: Jun. 28, 2018

(65) Prior Publication Data
US 2019/0324518 A1      Oct. 24, 2019

(30) Foreign Application Priority Data

Dec. 22, 2016  (WO) ................ PCT/CN2016/111439
Apr. 21, 2017  (WO) ................ PCT/CN2017/081414

(51) Int. Cl.
*G06F 1/32*     (2019.01)
*G06F 1/3212*   (2019.01)
*G06F 1/3234*   (2019.01)

(52) U.S. Cl.
CPC .......... *G06F 1/3212* (2013.01); *G06F 1/3275* (2013.01)

(58) Field of Classification Search
CPC ........................... G06F 1/3212; G06F 1/3275
See application file for complete search history.

(56) References Cited

U.S. PATENT DOCUMENTS

2012/0054752 A1*  3/2012  Chin ................... G06F 1/3278
                                                    718/100
2014/0235228 A1   8/2014  Hirako et al.
(Continued)

FOREIGN PATENT DOCUMENTS

CN        102088657 A      6/2011
CN        103369124 A      10/2013
(Continued)

OTHER PUBLICATIONS

Joseph Brownell, "Power Settings in Windows 10—Tutorial", Sep. 14, 2016, retrtieved from the Internet at <https://www.teachucomp.com/power-settings-in-windows-10-tutorial/>.*

(Continued)

*Primary Examiner* — Stefan Stoynov
(74) *Attorney, Agent, or Firm* — David D. Brush; Westman, Champlin & Koehler, P.A.

(57) ABSTRACT

A method for operating a device including a processing unit having a switchable power saving mode for reducing its power consumption. The method includes the following acts performed by the processing unit: determining if an application running in foreground is compatible with the power saving mode; and switching the power saving mode depending on whether the application running in foreground is determined compatible with the power saving mode.

18 Claims, 2 Drawing Sheets

(56) References Cited

U.S. PATENT DOCUMENTS

2015/0261284 A1    9/2015  Lee et al.
2015/0301588 A1*  10/2015  Jeong .................... G06F 1/3203
                                                           713/323

FOREIGN PATENT DOCUMENTS

| CN | 103442148 A | 12/2013 |
| CN | 104636233 A | 5/2015 |
| CN | 104834517 A | 8/2015 |
| CN | 105094284 A | 11/2015 |
| CN | 105334939 A | 2/2016 |
| CN | 105516515 A | 4/2016 |

OTHER PUBLICATIONS

International Search Report dated Jun. 8, 2018 for corresponding International Application No. PCT/IB2017/001662, filed Dec. 14, 2017.
International Preliminary Report on Patentability and English translation of the Written Opinion dated Jun. 25, 2019 for corresponding International Application No. PCT/IB2017/001662, filed Dec. 14, 2017.
International Search Report and Written Opinion dated Aug. 2, 2017 for corresponding International Application No. PCT/CN2016/111439, filed Dec. 22, 2016.
International Search Report and Written Opinion dated Nov. 3, 2017 for corresponding International Application Mo. PCT/CN2017/081414, filed Apr. 21, 2017.
International Preliminary Report of Patentability Chapter 1 dated Oct. 22, 2019 for corresponding International Application No. PCT/CN2017/081414, filed Apr. 21, 2017.

* cited by examiner

METHOD FOR OPERATING A DEVICE HAVING A SWITCHABLE POWER SAVING MODE FOR REDUCING ITS POWER CONSUMPTION

CROSS-REFERENCE TO RELATED APPLICATIONS

This Application is a Section 371 National Stage Application of International Application No. PCT/IB2017/001662, filed Dec. 14, 2017, the content of which is incorporated herein by reference in its entirety, and published as WO 2018/115958 A2 on Jun. 28, 2018, in English.

FIELD OF THE INVENTION

The field of this invention is that of mobile phones. More particularly, the invention relates to a method for operating a device so as to save battery power.

BACKGROUND OF THE INVENTION

Recent mobile phones (smartphones) offer numerous features, including GPS, internet, music, video playing, games and countless apps. Unfortunately, many of these features can take a toll on the device's battery power and cause it to drain quickly. It is often required to charge the battery every evening.

Several mobile operating systems such as Android or iOS provide for one or more "power saving mode(s)" which allow saving the mobile phone battery by reducing the mobile screen consumption or by reducing the mobile CPU (Central Processing Unit) consumption.

As far as screen consumption is concerned, when enabling a screen power saving mode, the display frame rate of the mobile phone screen may be reduced and its brightness may be lowered. Consequently, such a screen power saving mode may deteriorate the user experience with some applications if they need good screen display effects. For instance, decreasing the screen frame rate is not advisable if the application is a video player: the playing of a film would lack of smoothness and become unpleasant for the user.

As far as CPU consumption is concerned, when enabling a CPU saving power mode, it reduces CPU performances (through a limitation or its clock frequency and/or voltage), which may affect the behavior of applications if they need full CPU operation. If the power saving mode is switched on while there is an application running, such as GPS navigation, which requires a lot of CPU power, the application is thereby unpleasantly slowed down and the user experience is deteriorated.

There is therefore a need for an improved power saving mode which both improves the battery saving and does not impact the user experience.

SUMMARY OF THE INVENTION

For these purposes, an exemplary embodiment of the present invention provides a method for operating a device comprising at least one processing unit and a screen, said device having a switchable power saving mode for reducing the device power consumption, the method being characterized in that it comprises the following steps, performed by the processing unit:
  determining if an application running in foreground is compatible with the power saving mode;
  switching the power saving mode depending on whether the application running in foreground is compatible with the power saving mode.

As it will be shown, this astute use of an existing power saving mode allows saving even more energy by reducing the device consumption when low quality is sufficient, while preventing deteriorating user experience by not reducing the device consumption when high quality is required.

Exemplary but non limiting features of the present invention are as follow:
  the switching step comprises switching on the power saving mode if the application running in foreground is determined compatible with the power saving mode;
  the switching step comprises switching off the power saving mode if the application running in foreground is not determined compatible with the power saving mode;
  the device comprises a battery, the step of switching off the power saving mode if the application running in foreground is not determined compatible with the power saving mode being only performed when a level of said battery is above a predetermined threshold;
  the power saving mode comprises at least one switchable component, a component of the power saving mode being a screen power saving mode for reducing the power consumption due to the screen;
  the power saving mode comprises at least one switchable component, a component of the power saving mode being a CPU power saving mode for reducing the power consumption due to the processing unit;
  the device comprises a plurality of processing units, and wherein switching on the CPU power saving mode comprises switching off at least one of said processing units while keeping at least one of said processing units switched on;
  the power saving mode comprises a plurality of switchable component(s), the determining step comprising determining if the application running in foreground is compatible with each switchable component of the power saving mode;
  the switching step comprises, for each component of the power saving mode, switching said component depending on whether the application running in foreground is compatible with said component;
  the step of determining if an application running in foreground is compatible with the power saving mode is performed when detecting a change of application running in foreground;
  the method comprises a previous step of monitoring which application is running in foreground so as to detect any change;
  an application compatible with the power saving mode is an application which functions sensibly indistinguishably with or without the power saving mode;
  at least one application compatible with the power saving mode presents at least one given tag in its code and determining step (a) comprises checking the code of the application running in the foreground for said tag(s);
  at least one list of applications compatible with the power saving mode is stored in a memory unit and determining step comprises identifying the application running in foreground and checking the list(s) for said identified application;
  the method comprises a step of receiving from the user of the device, for at least one application stored in said memory unit, an indication about the compatibility of said application with the power saving mode, so as to build said list(s);

the method comprises a step of receiving from a server connected to the device through a network, for at least one application stored in said memory unit, an indication of said with the power saving mode, so as to build said list(s);

the device comprises a battery, the method being performed only when the processing unit is powered by said battery.

In a second aspect, the invention provides an electronic device comprising at least one processing unit and a screen, said electronic device having a switchable power saving mode for reducing its power consumption, said processing unit being configured to:

determine if an application running in foreground is compatible with the power saving mode;

switch the power saving mode depending on whether the application running in foreground is determined compatible with the power saving mode.

According to a third and a fourth aspects, the invention provides a computer program product, comprising code instructions for executing a method according to the first aspect for operating a device comprising at least one processing unit and a screen, the device having a switchable power saving mode for reducing its power consumption; and a computer-readable medium, on which is stored a computer program product comprising code instructions for executing a method according to the first aspect for operating a device comprising at least one processing unit and a screen, the device having a switchable power saving mode for reducing its power consumption.

BRIEF DESCRIPTION OF THE DRAWINGS

The above and other objects, features and advantages of this invention will be apparent in the following detailed description of an illustrative embodiment thereof, which is to be read in connection with the accompanying drawings wherein.

DETAILED DESCRIPTION OF AN ILLUSTRATIVE EMBODIMENT

Power Saving Mode

Figure 1:
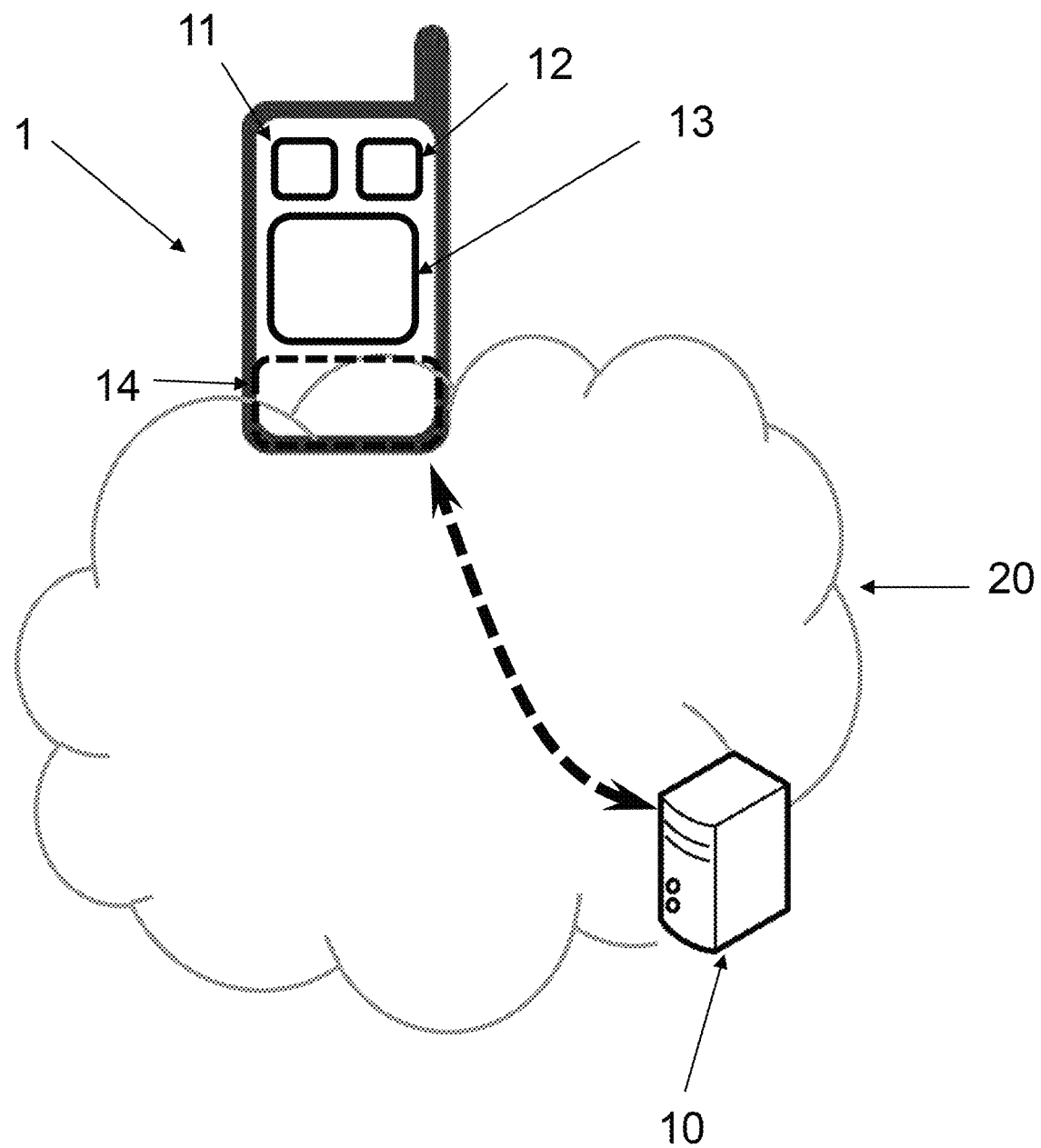
FIG. 1 illustrates an example of architecture in which the method according to the invention is performed.

The presently described power saving mode may comprise a "screen power saving mode" i.e. a power saving mode component reducing the power consumption of the screen (through a decrease of the brightness of the screen or a reduction of the screen frame rate, for instance)

Additionally or alternatively, the power saving mode may comprise a "CPU power saving mode", i.e. a power saving mode component reducing the power consumption of the CPU (through a limitation of its clock frequency and/or its voltage, for instance).

It is to be understood that such power saving mode may comprise other components having additional effects on the power consumption, for example a limitation of the amount of data wirelessly transmitted, etc.

In known mobile operating systems, this power saving mode or its components have to be switched on or off manually by the user himself. Optionally, the user may set that the power saving mode is automatically switched on at a given low battery level (for instance 5% or 15% in Android OS phones), so as to extend the time before the phone run out of battery (at the price of sacrificing the overall visual appearance).

Such a conventional power saving mode fulfills its role, but it might lead to inadequacy, at a certain time, between the actual display quality/CPU power and the display quality/CPU power needed by the running applications.

In particular, as far as conventional screen power saving mode is concerned:

the conventional power saving mode can be switched on while there is an application running, such as a game or a video player, which requires a certain screen performance, thereby making "uglier" the graphics of the application and deteriorating the user experience;

on the other hand, the conventional power saving mode can be switched off while there is an application running, such as e-book Reader, which does not require "gorgeous" graphics, thereby consuming uselessly screen power and depleting mobile battery;

and as far as conventional CPU power saving mode is concerned:

the conventional power saving mode can be switched on while there is an application running, such as GPS navigation, which requires a lot of CPU power, thereby slowing down the application and deteriorating the user experience;

on the other hand, the conventional power saving mode can be switched off while there is an application running, such as e-book Reader, which does not require a lot of CPU power, thereby consuming uselessly CPU power and depleting mobile battery.

Thus, if for instance the conventional power saving mode is set so as to be automatically switched on at a battery level of 15%:

From 100% to 15%→battery is wasted when using "low graphics" (i.e. not requiring a high display quality) and/or "low CPU power" applications;

From 15% to 0%→battery is saved but the user experience is highly deteriorated when using "high graphics" (i.e. actually requiring a high display quality) and/or "full CPU power" applications.

Considering these facts, a method for operating a device such as a mobile phone is herewith proposed, in which the power saving mode is switched on/off automatically according to the actual needs of the running application, as it will be explained in detail.

In other words, when considering again the above example of a power saving mode automatically switched on or off depending on a battery level threshold, it is proposed to "less save" the battery when its level is low (for instance below 15%) to not deteriorate the user experience, but to compensate this "overconsumption" by saving the battery even at high levels (for instance above 15%) by reducing the screen consumption when "low graphics"/"low CPU power" applications are used.

Consequently, the global battery life is not reduced and even extended, while deteriorating no more the user experience.

Architecture

An exemplary embodiment of the present invention relates to a method for operating a device 1 as represented by FIG. 1.

As explained, the device comprises one or more processing unit(s) 11 and a screen 13. In a specific embodiment, the device 1 comprises several independent processing units forming a single multi-core processor unit.

In the present method, the device 1 has a power saving mode for reducing its power consumption (which could also be designated as a "device power saving mode"), this power saving mode having one or more switchable component(s).

A component of this power saving mode may be a screen power saving mode for reducing the power consumption due to the screen 13, for instance by reducing the frame rate of screen 13 or its brightness.

Another component of this power saving mode may be a CPU power saving mode for reducing the power consumption due to the processing unit(s) 11. When there are several processing units 11 (e.g. in case of a device 1 having a multi-core processor), this CPU power saving mode may consist in switching off one or more, but not all, of these several processing units. Alternatively, this time independently of the number of processing unit(s), the CPU power saving mode may consist in reducing the frequency and/or the voltage of the processing unit(s). A combination of both processing unit(s) switching off and frequency/voltage reduction can be used for a device having several processing units.

The power saving mode is generally implemented by the operating system of device 1. The screen 13 is a user interface, possibly touch sensitive.

The device 1 typically further comprises a memory 12 (for example flash memory), in particular for storing applications, which can be of various types. The processing unit 11 is able to run simultaneously one or more of these applications, in particular:
- one application running in "foreground" (i.e. the application using the screen 13, with which the user interacts in real time, consuming most of the CPU scheduling and memory scheduling); and
- the possible other applications running in "background" (i.e. "behind the scenes", without user intervention and mostly without, if not at all, using the screen 13).

The application running in foreground uses the screen 13 and thus mostly defines the need for display quality. Furthermore, only the application running in foreground may need the full CPU power.

The device 1 also comprises a battery 14, in particular a rechargeable battery (for instance made of lithium polymer) for powering the screen 13 and other units. It is to be noted that the processing unit 11 might be configured to automatically switch off the power saving mode when plugged to a power supply (when charging the battery).

The device 1 may further comprise others units such as a location unit for providing location data representative of the position of the device 1 (using for example GPS, network triangulation, etc.), a communication unit for connecting (in particular wirelessly) the device 1 to a network 20 (for example WiFi, Bluetooth, and preferably a mobile network, in particular a GSM/UMTS/LTE network, see below), etc.

Indeed, the device 1 is typically a smartphone, a tablet computer, a laptop, etc. In the following description the example of a smartphone will be used.

Determination Step

The present method is performed by the processing unit 11 of the device, and is advantageously implemented by a dedicated software application, separate from the operating system. Alternatively, the present method can be implemented by the device operating system itself.

Figure 2:
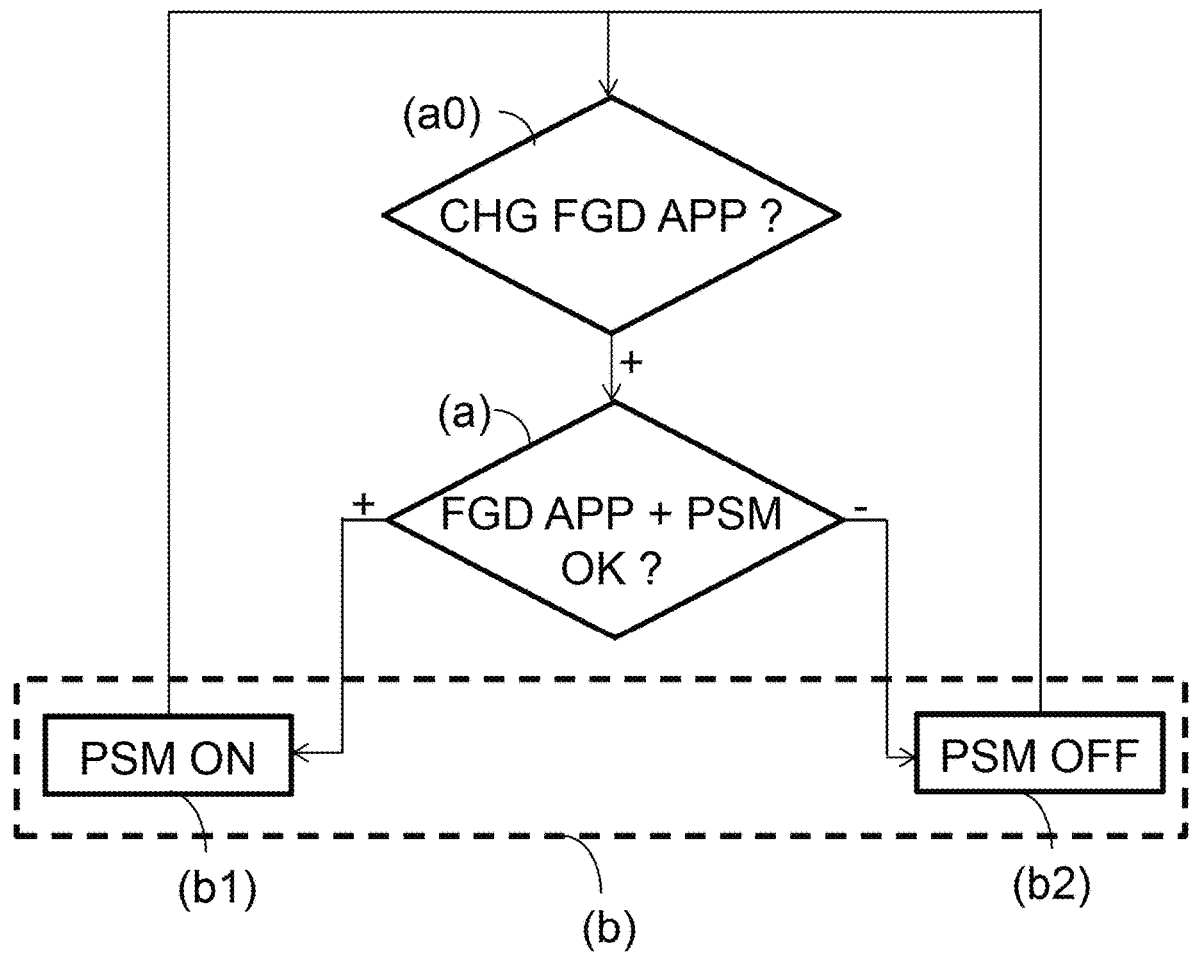
FIG. 2 is a diagram representing steps of a preferred embodiment of a method according to the invention.

As represented by the FIG. 2, it comprises a step (a) of determining if the application running in foreground is compatible with the power saving mode ("ForeGrounD APPlication compatible with (+) Power Saving Mode?").

This step (a) is preferably performed when detecting a change of application running in foreground ("CHanGe of ForeGrounD APPlication?"). More precisely, the dedicated software application (which runs in background) monitors the foreground in a previous step (a0), and performs the step (a) at each time the foreground application is changed, for instance because it is switched by the user: the determination step is performed on the new application which becomes running in the foreground.

If the power saving mode comprises more than one component (for instance both the screen power saving mode, and the CPU power saving mode"), the application running in foreground shall preferably be compatible with each of these components to be compatible with the power saving mode. It is to be noted that a set of components can be selected (components for which the switching is "automatic") notably by the user, and the determining step (a) is only performed for these selected components.

In a first embodiment where the power saving mode comprises, or even consists of, a screen power saving mode, it is checked at this determined step (a) whether the application running in foreground is an application compatible with the screen power saving mode.

By an application "compatible with the screen power saving mode", it is meant a "low graphics application", i.e. an application without high display quality requirements, which can run normally in a screen power saving mode (without visual quality degradation). It is typically an application whose display is mainly still, for example a messaging application, a reading application, an internet browser, etc. By contrast an application "not compatible with the screen power saving mode" is a "high graphics application", i.e. an application with high display quality requirements which cannot run properly in a screen power saving mode (because they need high screen power consumption to perform smoothly and aesthetically on the screen 13). It is typically an application with an animated display, for example a movie player, a game, etc.

In a second embodiment where the power saving mode comprises, or consists of, a CPU power saving mode, it is checked at this determined step (a) whether the application running in foreground is an application compatible with the CPU power saving mode.

By application "compatible with the CPU power saving mode", it is meant a "low CPU power application", i.e. an application which can run normally in a CPU power saving mode (without performance degradation), for example a messaging application, a reading application, an internet browser, etc. By contrast an application "not compatible with the CPU power saving mode" is a "full CPU power" application, i.e. an application which cannot run properly in a CPU power saving mode (because they need as much CPU power as possible to perform in real time), for example a movie player, a GPS navigation application, a game, etc.

When the device 1 comprises a plurality of processing units 11 (e.g. a multi-core CPU), the determination step (a) can comprise determining whether the application running in foreground can run with a reduced number of processing units switched on, or even with only one of said processing units 11 switched on, all the other processing units being switched off.

To sum up, any high graphics application is considered as not compatible with the screen power saving mode, and any full CPU power application is considered as not compatible with the CPU power saving mode.

For example, if the power saving mode only comprises a screen power saving mode component, a GPS navigation application will be considered compatible, but not if the power saving mode also comprises a CPU power saving mode component.

In a general way, it can be considered that any application which functions (while in foreground) sensibly indistinguishably with or without the power saving mode (i.e. the user is not able to perceive any degradation of quality of service) is compatible, whereas any application which functions distinguishably not as well (while in foreground) when the power saving mode is on (i.e. the user is able to perceive a degradation of quality of service) is not compatible.

The same reasoning could be made for each component of the power saving mode taken individually.

The step (a) of determining if the application running in foreground is compatible with the power saving mode might be performed in various ways, in particular by checking an indicator associated with each application which may run on the device 1.

In a first embodiment, a list of these indicators (under the form of a list of applications compatible with the power saving mode) is stored in the memory unit 12 of the device 1. Step (a) thus further comprises identifying the application running in foreground, and checking the list for said identified application.

For building this list, the method might comprise a further step (advantageously performed before step (a)) of receiving from a user of device 1, for one or more application(s) stored in said memory unit 12, an indication about the compatibility of this application with the power saving mode. In other words, the list may be obtained following an input from the user, which may be presented with a menu listing all potential applications in order to decide, for each application, whether he considers the application to be compatible the power saving mode, i.e. whether he wants to use power saving mode or not (for instance with an on/off toggle bar). This new menu can be proposed in a specific operator's application or as an additional menu of the operating system. At each time a new application is installed on the memory 12, it may be further asked for this application whether he wants to use power saving mode or not.

It is to be noted that there could be several lists if there are several components of the power saving mode (a list of applications compatible with the screen power saving mode, a list of applications compatible with the CPU power saving mode, etc.), and step (a) may comprise checking each list corresponding to a selected component of the power saving mode for said identified application (the application must be in every checked list to be determined wholly compatible).

Alternatively, in order to build the list(s), the processing unit 11 may obtain remotely the compatibility indication(s), for instance by receiving it from a server 10 connected to the device 1 via the network 20. The reception of such compatibility information may be triggered by the device 1 requesting this compatibility information remotely. Similarly, each time a new application is installed on the device 1 and stored in the memory 12, a new request for compatibility information can be sent to the server 10, which may return an indication about the compatibility of this specific application.

In another embodiment, at least one application compatible with the power saving mode presents one or more given tag in its code (a tag representative of the compatibility of the application with the power saving mode or one of its components), step (a) then comprises checking the code of the application running in the foreground for said tag(s). In other words, the applications can be tagged by such an indicator by the application developers themselves, when they develop the application code. In such a case, when detecting a new application running in foreground, the dedicated software application looks for such tag(s) in a specific part of the application code and takes its decision on that basis.

It has to be noted that both approaches may be combined: when a new application runs in foreground, the processing unit 11 may determine if this application is compatible with the power saving mode by both checking the code of the running application for the given tag(s), and checking the list(s) for the running application. If at least one criterion is met (i.e. the application code presents the given tag(s) and/or is found in the list(s)), then the application is considered as being compatible, if neither are met (i.e. the application does not present all the given tag(s) and is not found in one of the checked list(s)), then it is considered as not being compatible.

Switching Step

In a further step (b), the power saving mode is activated or not as a function of the result of the compatibility determination.

In particular, the power saving mode is switched depending on whether the application running in foreground is determined compatible with the power saving mode Advantageously, the power saving mode is switched on if the application running in foreground is determined compatible with the power saving mode (alternative (b1) of FIG. 2—"Power Saving Mode ON"). It has to be understood that if the power saving mode was already on, its state is not modified.

Advantageously, the power saving mode is switched off if the application running in foreground is not determined compatible with the power saving mode (alternative (b2) of FIG. 2—"Power Saving Mode OFF"). Similarly, it has to be understood that if the power saving mode was already off, its state is not modified.

As already explained, it may be provided that switching on the power saving mode is being performed only when the processing unit 11 is powered by said battery 14. In other words, if the device is powered by a power supply (i.e. the battery 14 is charging), then the power saving mode may not be available (as there is a "limitless" supply of energy, there is no need to stress the screen by requesting a consumption reduction).

Furthermore, an additional condition may be provided that under a given "critical" battery level (advantageously lower than the known levels for automatically switching on the power saving mode, for example inferior than 5%, 3% or even 2%), the power saving mode is kept on even if the application running in the foreground is not compatible with it. This way, in case of emergency, this power saving mode can be activated by the user (if for instance he wants the device 1 to not run out of battery at any cost), even at the cost of the user experience deterioration.

Alter the power saving mode is switched on/off, the system reverts to the state of monitoring the foreground application for change (step (a0)).

In the first embodiment mentioned before where the power saving mode comprises a screen power saving mode, switching the power saving mode on implies switching the screen power saving mode on, for instance by reducing the screen frame rate or the brightness of the screen 13.

In the second embodiment mentioned before where the power saving mode comprises a CPU power saving mode, switching the power saving mode on implies switching the CPU power saving mode on, for instance by reducing the frequency and/or the voltage of the processing unit 11. In a more specific embodiment where the device 1 comprises several processing units 11 (e.g. multi-core CPU), this can be achieved by switching off some of the processing units 11, or even all of them but one.

It is to be noted that in case of a plurality of components, the whole power saving mode can be switched on or off (i.e. every components), or only some components (in particular among said set of selected components already discussed) depending on whether the application running in foreground is compatible with said component of the power saving mode.

For instance, if the application running in foreground is determined not compatible only with the CPU power saving mode (for example a GPS application) while a two components power saving mode (CPU+screen) is on, either the whole power saving mode is switched off, or only the CPU power saving mode so as to keep the screen power saving mode with is still compatible with the application. Any combination is possible: the user may select components by defining for each of them if it is "on", "off" or "automatic", only the components in automatic mode being selected, i.e. checked for compatibility during step (a) and possibly switched during step (b).

EXAMPLE

In order to illustrate the present invention, an example involving only a screen power saving mode is described hereafter.

At a first instant, a real-time game is used in foreground. The processing unit 11 checks and finds that this application needs high display quality and thus is not "screen power saving mode" compatible.

Then the user switches from application by starting an eBook reader application: this eBook reader application becomes the application running in foreground while the real-time game becomes an application running in background (it does not use the screen 13 anymore).

The processing unit 11 detects this change of foreground application, checks if the eBook reader application is "screen power saving mode" compatible and, since it detects that it is the case, triggers the switching on of the screen power saving mode, for instance by reducing the screen frame rate or triggering the screen brightness reduction.

Later on, when the user stops using the eBook reader application, the processing unit 11 can check which type of application is now running in foreground. For instance, if the user plays again with the aforementioned real-time game, which then comes back running in foreground, the processing unit 11 detects this new change of foreground application, determines that the application now running in foreground needs high display quality, and thus is not "screen power saving mode" compatible, so that it triggers the switching off of the screen power saving mode, for instance by increasing the screen frame rate back or increasing the screen brightness.

It has to be noted that the processing unit 11 can decide to automatically trigger the switching off of the power saving mode when stopping using a "screen power saving mode" compatible application running in the foreground, in order to automatically return to normal mode.

Device and Computer Program

An exemplary embodiment of the present invention concerns an electronic device 1 comprising at least one processing unit 11 and a screen 13, said electronic device 1 having a switchable power saving mode for reducing its power consumption. The processing unit 11 is adapted for carrying out the method for operating as previously described. This device 1 may also comprise a memory 12, a battery 14.

The aforementioned processing unit 11 is in particular configured to implement the steps of:
- determining if an application running in foreground is compatible with the power saving mode;
- switching the power saving mode depending on whether the application running in foreground is determined compatible with the power saving mode or not (in particular, switching it on when the application is determined compatible with the power saving mode or switching it off when the application is determined not compatible with the power saving mode).

An exemplary embodiment of the invention further proposes a computer program product, comprising code instructions for executing (in particular with a processing unit 11 of the device 1) the previously described method, as well as a computer-readable medium (in particular a memory 12 of the device 1), on which is stored a computer program product comprising code instructions for executing said method. In particular, this computer program product may correspond to the dedicated software application discussed previously.

Although the present disclosure has been described with reference to one or more examples, workers skilled in the art will recognize that changes may be made in form and detail without departing from the scope of the disclosure and/or the appended claims.

The invention claimed is:

1. A method for operating a device comprising at least one processing unit and a screen, said device having a switchable power saving mode for reducing the device power consumption, the method comprising the following acts:
   (a) determining by means of the processing unit if an application running in foreground is compatible with the power saving mode, wherein the application is determined as being compatible with the power saving mode when it functions sensibly indistinguishably with or without the power saving mode; and
   (b) switching the power saving mode depending on whether the application running in foreground is compatible with the power saving mode.

2. The method according to claim 1, wherein the switching act (b) comprises switching on (b1) the power saving mode if the application running in foreground is determined compatible with the power saving mode.

3. The method according to claim 1, wherein the switching act (b) comprises switching off (b2) the power saving mode if the application running in foreground is not determined compatible with the power saving mode.

4. The method according to claim 3, wherein the device comprises a battery and wherein the act of switching off the power saving mode if the application running in foreground is not determined compatible with the power saving mode is only performed when a level of said battery is above a predetermined threshold.

5. The method according to claim 1, wherein the power saving mode comprises at least one switchable component, a component of the power saving mode being a screen power saving mode for reducing the power consumption due to the screen.

6. The method according to claim 1, wherein the power saving mode comprises at least one switchable component, a component of the power saving mode being a CPU power saving mode for reducing the power consumption due to the processing unit.

7. The method according to claim 6, wherein the device comprises a plurality of processing units and wherein switching on the CPU power saving mode comprises switching off at least one of said processing units while keeping at least one of said processing units switched on.

8. The method according to claim 1, wherein the power saving mode comprises a plurality of switchable components, the determining act (a) comprising determining if the application running in foreground is compatible with each switchable component of the power saving mode.

9. The method according to claim 8, wherein the switching act (b) comprises, for each component of the power saving mode, switching said component depending on whether the application running in foreground is compatible with said component.

10. The method according to of claim 1, wherein determining (a) if an application running in foreground is compatible with the power saving mode is performed when detecting a change of application running in foreground.

11. The method according to claim 10, comprising a previous act (a0) of monitoring which application is running in foreground so as to detect any change.

12. The method according to claim 1, wherein at least one application compatible with the power saving mode presents at least one given tag in its code and determining act (a) comprises checking the code of the application running in the foreground for said tag.

13. The method according to claim 1, wherein at least one list of applications compatible with the power saving mode is stored in a memory unit and determining act (a) comprises identifying the application running in foreground and checking the list for said identified application.

14. The method according to claim 13, comprising an act of receiving from a user of the device, for at least one application stored in said memory unit, an indication about the compatibility of said application with the power saving mode, so as to build said list.

15. The method according to claim 13, comprising an act of receiving from a server connected to the device through a network, for at least one application stored in said memory unit, an indication about the compatibility of said application with the power saving mode, so as to build said list.

16. The method according to claim 1, wherein the device comprises a battery, and the method is performed only when the processing unit is powered by said battery.

17. An electronic device comprising:
   at least one processing unit;
   a screen; and
   a switchable power saving mode for reducing power consumption of the electronic device,
   said processing unit being configured to:
      determine if an application running in foreground is compatible with the power saving mode, wherein the application is determined as being compatible with the power saving mode when it functions sensibly indistinguishably with or without the power saving mode;
      switch the power saving mode depending on whether the application running in foreground is determined compatible with the power saving mode.

18. A non-transitory computer-readable medium, on which is stored a computer program product comprising code instructions for executing a method for operating a device comprising at least one processing unit and a screen, the device having a switchable power saving mode for reducing its power consumption, wherein the code instructions, when executed by the processing unit, configure the processing unit to:
   (a) determine if an application running in foreground is compatible with the power saving mode, wherein application is determined as being compatible with the power saving mode when it functions sensibly indistinguishably with or without the power saving mode; and
   (b) switch the power saving mode depending on whether the application running in foreground is compatible with the power saving mode.

* * * * *